United States Patent
Kava et al.

(10) Patent No.: US 10,189,472 B2
(45) Date of Patent: Jan. 29, 2019

(54) SMART TRAILER CLASSIFICATION SYSTEM

(71) Applicant: Ford Global Technologies, LLC, Dearborn, MI (US)

(72) Inventors: Chris Michael Kava, Taylor, MI (US); Mark Anthony Rockwell, Wyandotte, MI (US); Kent Hancock, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 350 days.

(21) Appl. No.: 15/097,981

(22) Filed: Apr. 13, 2016

(65) Prior Publication Data

US 2017/0297563 A1 Oct. 19, 2017

(51) Int. Cl.
| | |
|---|---|
| *B60W 30/02* | (2012.01) |
| *B60W 10/06* | (2006.01) |
| *B60W 10/11* | (2012.01) |
| *F02D 41/24* | (2006.01) |
| *F02D 41/26* | (2006.01) |
| *F02D 41/30* | (2006.01) |
| *F16H 61/02* | (2006.01) |
| *G01C 21/26* | (2006.01) |

(52) U.S. Cl.
CPC ............ *B60W 30/02* (2013.01); *B60W 10/06* (2013.01); *B60W 10/11* (2013.01); *F02D 41/2406* (2013.01); *F02D 41/26* (2013.01); *F02D 41/3005* (2013.01); *F16H 61/0213* (2013.01); *G01C 21/26* (2013.01); *B60W 2300/14* (2013.01); *B60W 2550/142* (2013.01); *B60W 2710/0627* (2013.01); *F16H 2061/0223* (2013.01)

(58) Field of Classification Search
CPC ...... B60W 10/06; B60W 10/11; B60W 30/02; B60W 2300/14; B60W 2550/142
See application file for complete search history.

(56) References Cited

U.S. PATENT DOCUMENTS

| | | | |
|---|---|---|---|
| 6,655,222 B2 | 12/2003 | Hessmert et al. | |
| 6,839,615 B2 * | 1/2005 | Yanase | B60T 8/172 701/1 |
| 7,786,849 B2 | 8/2010 | Buckley | |
| 8,380,390 B2 | 2/2013 | Sy et al. | |
| 2007/0271017 A1 | 11/2007 | Samie | |
| 2010/0211248 A1 * | 8/2010 | Craig | B60W 30/02 701/31.4 |
| 2013/0225367 A1 * | 8/2013 | Dietzel | F16H 59/20 477/97 |
| 2014/0358436 A1 | 12/2014 | Kim | |

* cited by examiner

*Primary Examiner* — Edwin A Young
(74) *Attorney, Agent, or Firm* — Julia Voutyras; McCoy Russell LLP

(57) ABSTRACT

Methods and systems are provided for classification of the type and weight of a trailer being towed by a vehicle. The classification is based on a comparison between a real-time road gradient as determined by the vehicle system and an expected road gradient as determined from an off-board or an onboard map. Vehicle operations may be adjusted based on the classification of the attached trailer.

20 Claims, 8 Drawing Sheets

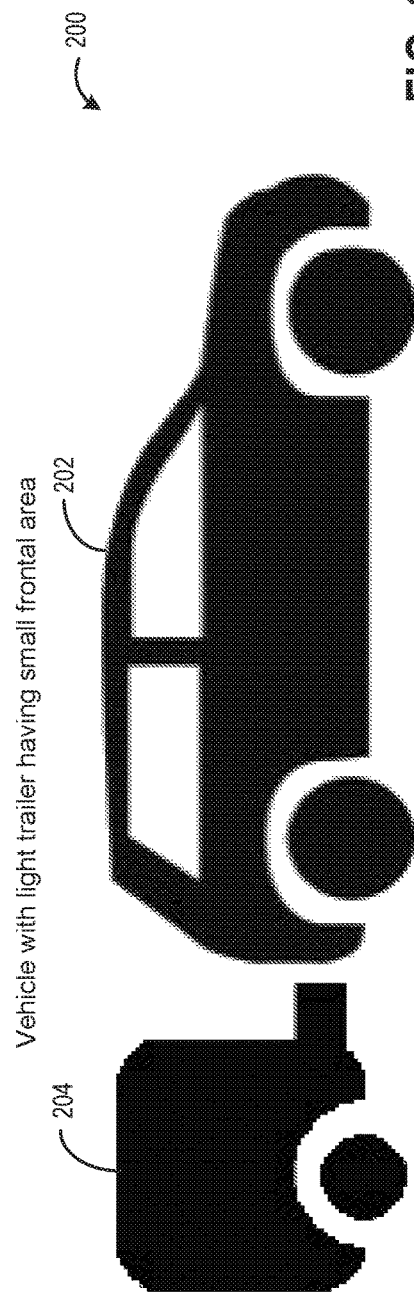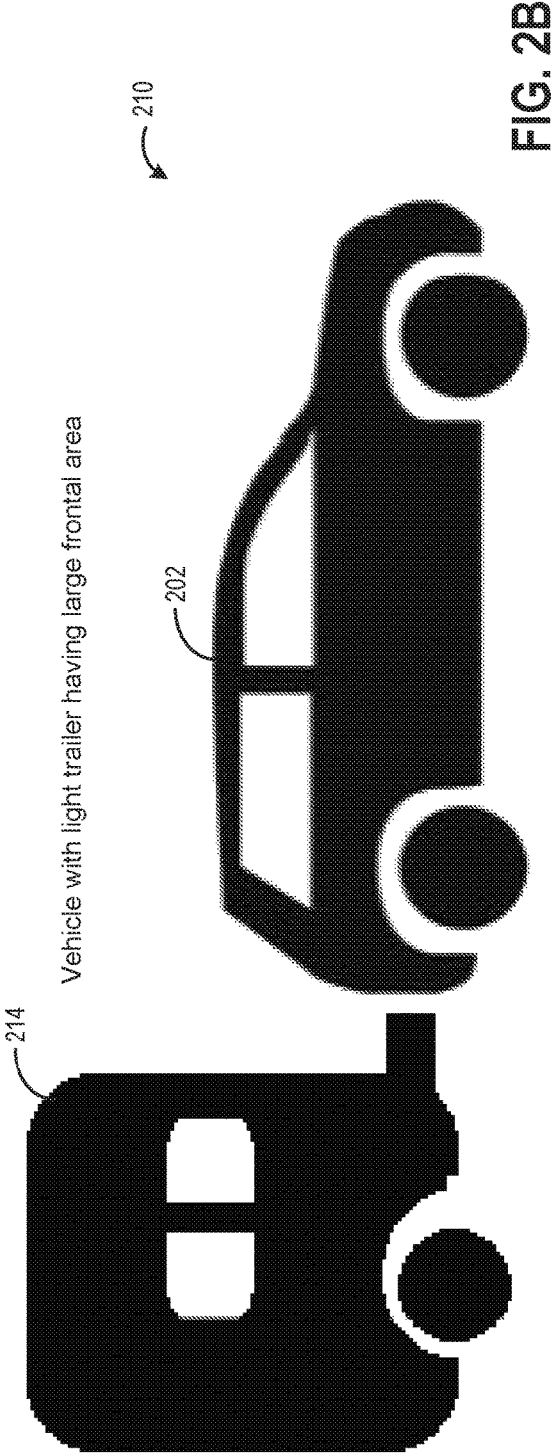

SMART TRAILER CLASSIFICATION SYSTEM

FIELD

The present description relates generally to methods and systems for classifying the type and weight of a trailer being towed by a vehicle, and automatically adjusting operation responsive thereto.

BACKGROUND/SUMMARY

Vehicles are capable of towing along a variety of trailers and/or cargo. Vehicle powertrain control units are configured to optimize vehicle performance at a pre-defined operating mass. Consequently, vehicle operations may need to be modified upon addition of a trailer and/or cargo to the vehicle. In one example, vehicles may be equipped with a specialized operating mode wherein vehicle operation is optimized for towing operations. The operating mode may be selected automatically or based on operator input. However in order to improve vehicle performance during towing, the size, weight and other characteristics of the trailer that is being towed may need to be input to the vehicle controller.

Accordingly, various approaches have been developed to detect a trailer and/or cargo coupled to a vehicle. One example approach shown by Hessmert et al. in U.S. Pat. No. 6,655,222 discloses a method to determine a trailer load attached to a vehicle based on an estimation of a current road gradient. Therein, wheel contact forces are used to estimate the current road gradient and total vehicle system mass. If a trailer and/or cargo is coupled to the vehicle, the total vehicle system mass is expected to be higher than the standard mass of the vehicle itself. The difference in mass may be used by the vehicle controller to detect the presence of a trailer and/or cargo coupled to the vehicle as well as to determine the mass of the attached trailer and/or cargo.

However, the inventors herein have recognized potential disadvantages with the above approaches. As one example, they may be unable to effectively characterize the size and in particular the size and optionally the shape of frontal area of the trailer. As such, for a trailer of a given mass, based on the size of the frontal area, wheel contact forces may change. The wheel contact forces may further change based on the vehicle speed and instantaneous road conditions (which may be different from the average road conditions). In the absence of accurate estimation of trailer characteristics, the vehicle may have to switch gears frequently causing shuffles, delays and trouble while accelerating, thereby impacting the driving experience. Also, operating a vehicle with a higher than expected weight without significant adjustments to powertrain operations may lead to increased fuel consumption and a high level of stress on powertrain components, leading to warranty issues. Vehicle stability and control may also be affected by operating the vehicle without compensating for the additional towing load.

The inventors herein have identified an approach by which the issues described above may be at least partly addressed. One example method includes during vehicle driving over a road segment, inferring characteristics of a trailer attached to a vehicle based on a real-time road gradient relative to an expected road gradient for the road segment; and adjusting vehicle operations based on the inferred characteristics. In this way, trailer characteristics may be reliably determined and engine operation adjusted accordingly.

As an example, a vehicle control system may automatically detect the presence and details of a trailer and/or cargo attached to a vehicle during vehicle travel based on a real-time estimate of a road gradient. A controller may estimate the gradient of the road on which the vehicle is travelling in real-time based on an estimated wheel force. Wheel forces may be estimated during different driving conditions such as during acceleration, deceleration, and steady-state vehicle speeds, and on road segments having variations in elevation. The real-time estimated road gradient is then compared to an externally sourced road gradient estimate, such as one retrieved from an off-board map via a navigation system of the vehicle. As such the real-time road gradient as estimated based on wheel forces may be influenced by the size (dimension and volume of trailer), weight (mass of trailer), and size (dimension and volume) of a frontal area of a trailer coupled to the vehicle. Based on a difference between the real-time estimated road gradient and the externally sourced road gradient, the controller may determine if a trailer is being towed by the vehicle, and further determine trailer characteristics such as trailer size, weight and size of frontal area. In particular, a difference between the wheel forces in the real-time estimate and the externally sourced estimate may be attributed to an additional load being towed by the vehicle. For example, based on the comparison, the controller may determine if the trailer is heavy or light, and further determine if the trailer has a larger or a smaller frontal area. In one example, the classification of the attached trailer may be carried out automatically without the requirement of any input from the user. Based on the determined trailer characteristics, engine operating parameters of the vehicle may be adjusted to improve vehicle performance. For example, a transmission gear shift schedule and fuel usage may be adjusted. Optionally, in the event that an off-board map is not available, an on-board map for a frequently travelled road segment may also be generated based on the real-time gradient estimate, and used during future travel on the given road segment.

In this way, by comparing a measured (real-time) road gradient to an expected externally-sourced road gradient, it may be possible to not only determine the presence of a trailer but also estimate trailer characteristics including its size, weight, and size of frontal area. The comparison enables difference in wheel forces between the measured estimate and expected estimate to be correlated with specific trailer characteristics such as the presence of a small or large frontal area. By reliably determining trailer characteristics (including details of weight, size, and size of frontal area of the trailer) during vehicle travel, engine performance may be optimized for the specific kind of trailer, thereby improving operator driving experience, drivetrain temperature management, and fuel efficiency. The technical effect of creating and updating an on-board map with road gradient information is that even in the absence of an off-board map, such as due to lack of wireless connectivity and/or navigation data, the on-board map may be effectively used for determination of trailer characteristics.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A shows an example vehicle system with a lighter weight trailer having a smaller frontal area coupled to the vehicle.

FIG. 2B shows an example vehicle system with a lighter weight trailer having a larger frontal area coupled to the vehicle.

DETAILED DESCRIPTION

Figure 1:
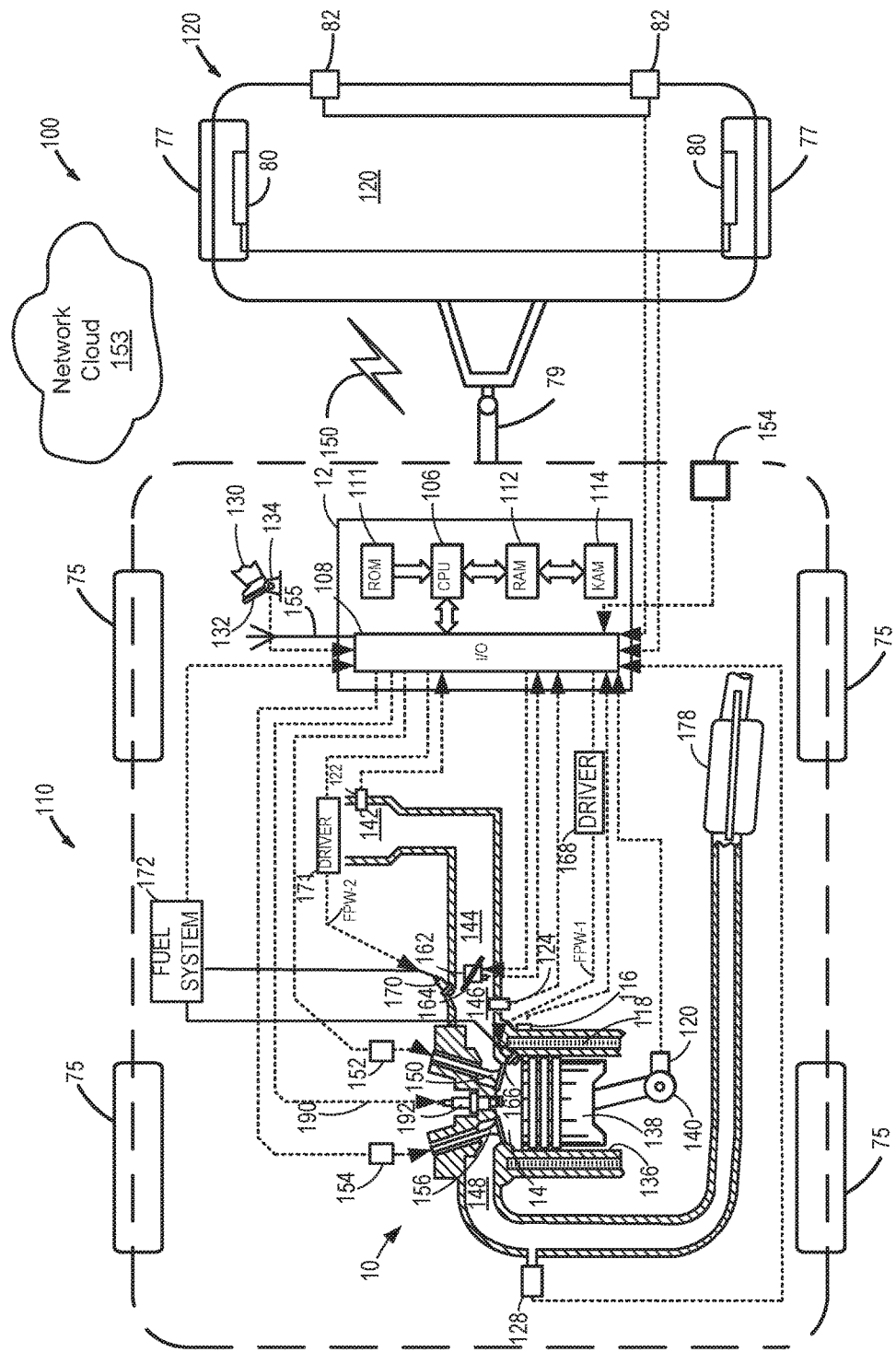
FIG. 1 shows an example vehicle system with an attached trailer.
Figure 5:
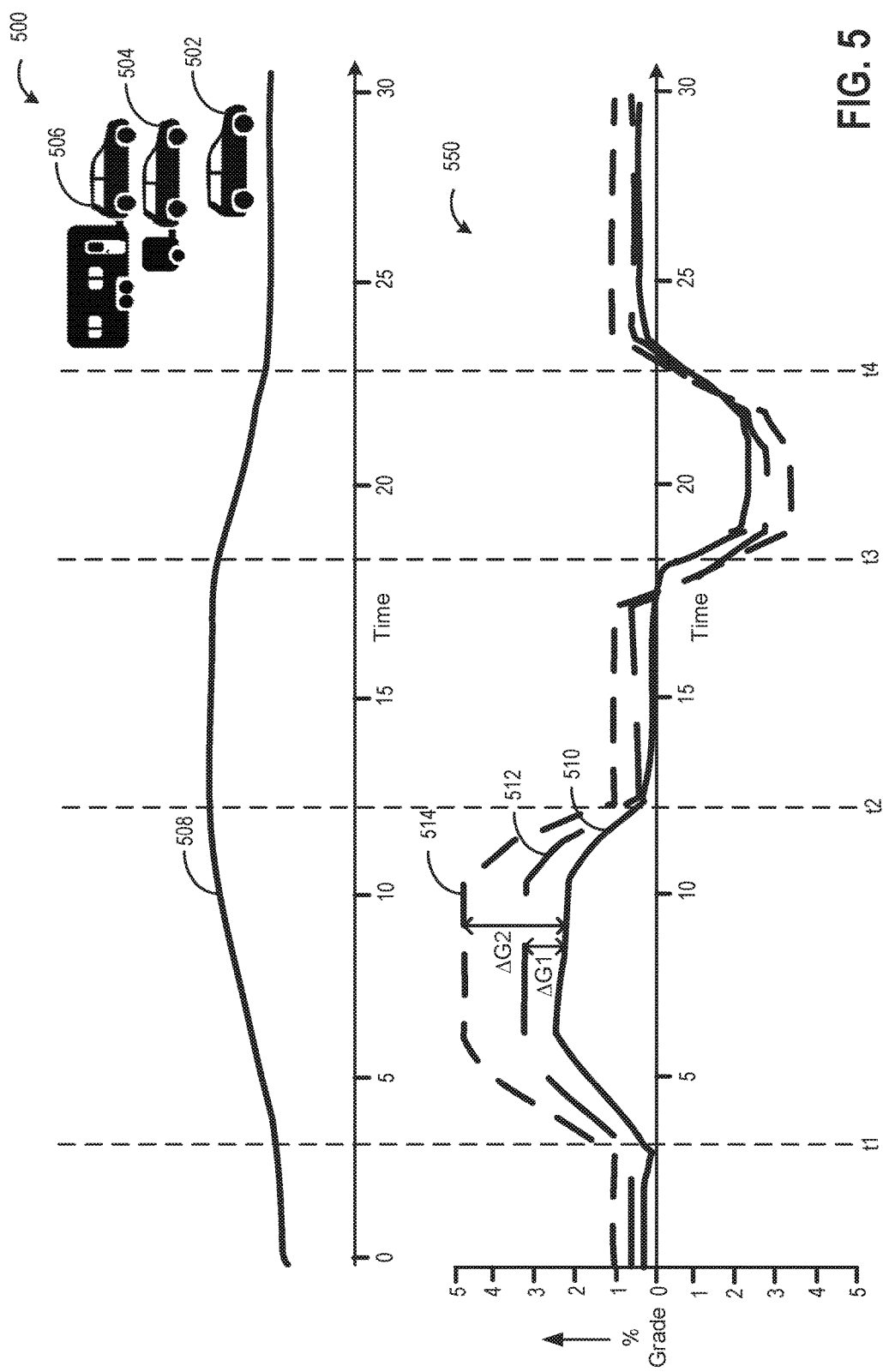
FIG. 5 shows an example differentiation between a small and a large trailer based on road gradient estimations.
Figure 6:
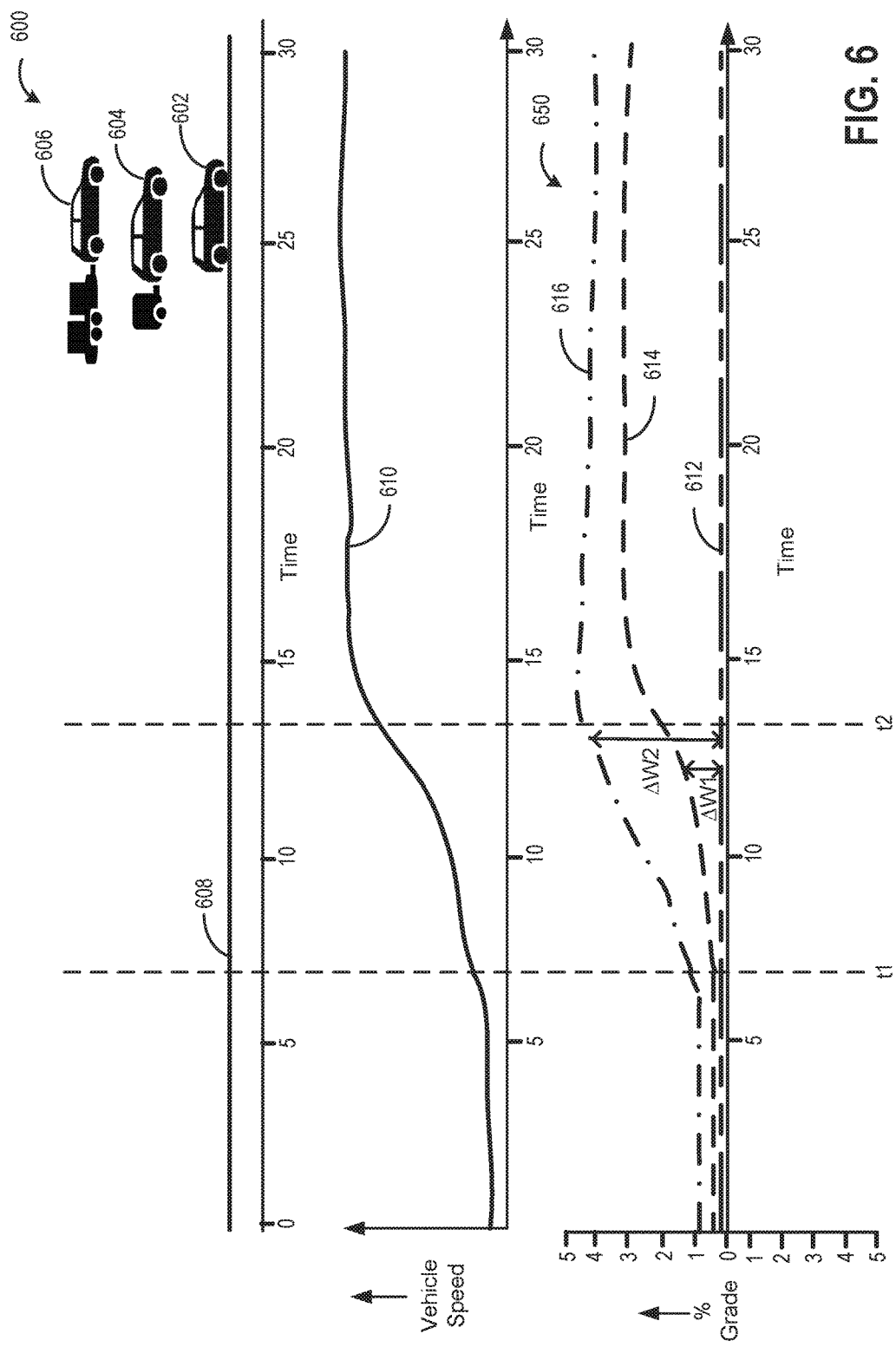
FIG. 6 shows an example differentiation between a light and a heavy trailer based on road gradient estimations.
Figure 7:
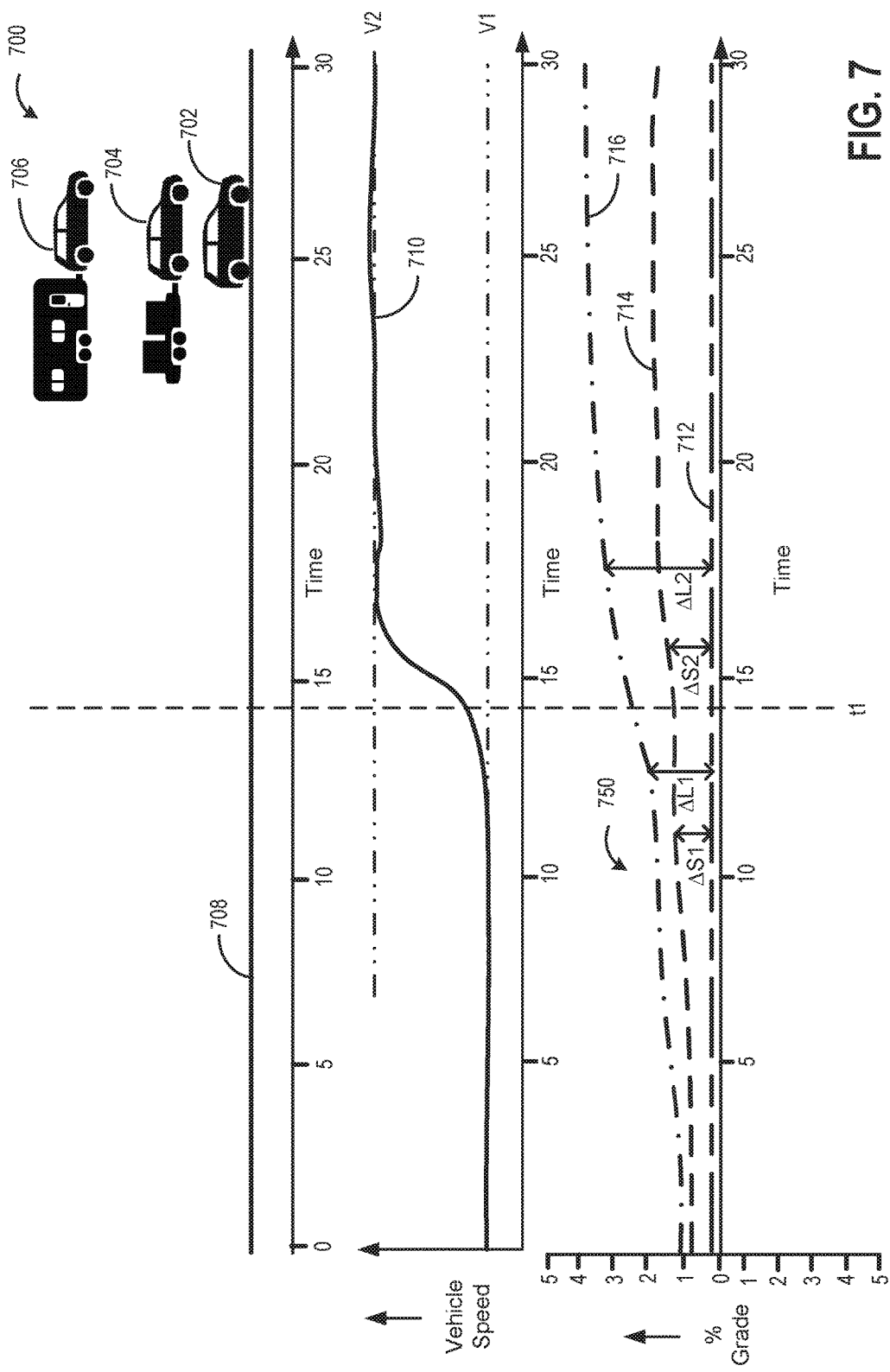
FIG. 7 shows an example differentiation between a trailer with a small frontal area and a trailer with a large frontal area based on road gradient estimations.

The following description relates to systems and methods for classifying the type and weight of a trailer being towed by a vehicle system, such as the vehicle system of FIG. 1. The trailer attached to the vehicle system of FIG. 1 can have different characteristics (size, weight, size of frontal area) as shown by way of example in FIGS. 2A, 2B, 2C, and 2D. An engine controller may perform a control routine, such as the example routine of FIG. 3, to determine a real-time road gradient of a road section being travelled by the vehicle system with the trailer and compare it to an expected road gradient retrieved from a source external to the vehicle. The controller may further perform a control routine, such as the routine of FIG. 4 to determine the characteristics of the trailer attached to the vehicle system of FIG. 1 based on a comparison of the road gradients. FIGS. 5, 6, and 7 show examples of trailer differentiation based on road gradient estimation comparisons during different driving conditions. In this way, the performance of a towing vehicle can be improved.

FIG. 1 shows example embodiment of a vehicle system 100 comprising a vehicle 110 with an attached trailer 120. In this example, the vehicle 110 is an on-road vehicle with two pair of wheels 75. The vehicle 110 comprises an internal combustion engine 10 which includes a plurality of cylinders or combustion chambers, one of which (cylinder 14) is depicted in FIG. 1. The vehicle 110 also includes a transmission (not shown) with a plurality of gearsets, the transmission coupling the engine 10 to vehicle wheels 75. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. A throttle 162 including a throttle plate 164 may be provided along an intake passage of the engine for varying the flow rate and/or pressure of intake air provided to the engine cylinders. For example, throttle 162 may be disposed downstream or downstream of a compressor (not shown).

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (DI) of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (PFI) into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172. Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load and/or knock, such as described herein below.

Fuel tank in fuel system 172 may hold fuel with different fuel qualities, such as different fuel compositions. These differences may include different alcohol content, different octane, different heat of vaporizations, different fuel blends, and/or combinations thereof etc. As described above, FIG. 1 shows only one cylinder of a multi-cylinder engine. As such each cylinder may similarly include its own set of intake/exhaust valves, fuel injector(s), spark plug, etc. As elaborated herein, fuel usage may be adjusted based on the presence of a trailer, and further based on trailer characteristics that are determined in real-time during vehicle travel.

Controller 12 is shown in FIG. 1 as a microcomputer, including microprocessor unit 106, input/output ports 108, an electronic storage medium for executable programs and calibration values shown as read only memory chip 111 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. Example routines that may be performed by the controller is described at FIGS. 3 and 4. The controller 12 receives signals from the various sensors of FIG. 1 and employs the various actuators of FIG. 1 to adjust engine operation based on the received signals and instructions stored on a memory of the controller 12.

Vehicle system 100 includes a trailer 120 attached to a rear section of vehicle 110 via a hitch 79. A plurality of sensors and/or cameras (not shown) may be attached to hitch 79 for determining the presence of a trailer. The trailer may be of different sizes (e.g., small, or large in dimension), different weights (e.g., heavy, light), and have different sizes of frontal area (e.g., small frontal area, large frontal area).

In the depicted example, the trailer 120 includes a pair of wheels 77 and a pair of brakes 79 are shown to be present on the trailer 120. In alternate embodiments, the trailer may comprise any number of axles/wheels and brakes. The brake system may directly communicate (send and receive signals) with the engine controller 12. The vehicle brakes and the trailer brakes may each be operated and controlled separately, independently, in unison, simultaneously, interdependently, or in some other format depending upon the vehicle operating conditions. Taillights 79 and other lighting fixtures may be included in the trailer 120. The electrical system of the trailer may also be coupled to the electrical system of vehicle 110 via engine controller 12. In an alternate embodiment, communication between the trailer and the vehicle system may be wireless in which case both the vehicle and trailer may have transceivers (not shown) for such communication.

Vehicle system 100 further includes a navigation system 154 housed in vehicle 110. Navigation system 154 may be communicatively coupled to the control system 12 of engine 10 and may be configured to determine a location (e.g., GPS co-ordinates of the vehicle) of the vehicle system 100 at any instant of time. The navigation system 154 may also be used by an operator to navigate the vehicle to a destination. Therein, the navigation system may provide details regarding route options, as well as road and weather details for each route of travel. As an example, the control system may obtain road gradient information for a road segment being travelled on by the vehicle (currently) as well as road gradient information for a road segment that will be travelled on by the vehicle (in the future). Also road gradient information for the entire route of the vehicle's journey may be obtained and stored in the controller memory as an off-board map of the route. The navigation system may be communicatively connected to an external server and/or network cloud 153 via wireless communication 150. As elaborated herein, the navigation system 154 may determine the current location of the vehicle system 100 and obtain road gradient information from network cloud 153 for use in trailer 120 characteristics determination.

Vehicle system 100 further includes a wireless communication device 155 housed in vehicle 110 The control system 12 may also be coupled to a wireless communication device 155 for direct communication of the vehicle 110 with a network cloud (external server) 153. The wireless communication device 155 may also be used to communicate with other similar vehicles via vehicle to vehicle (V2V) technology. The vehicles may be part of a common fleet of vehicles, vehicle of a similar make, and/or model, vehicles operational within a threshold radius of the given vehicle, or combinations thereof. Using the wireless communication device 155 and/or V2V technology, the vehicle 110 may directly retrieve road gradient information from an external server or other similar vehicles and stored the retrieved information on-board vehicle 110.

As such, in order to optimize the operating conditions of the vehicle, the various characteristics of the trailer 120 may need to be accurately determined. For example, for a given trailer, based on size, weight, and in particular size of frontal area, the driving experience of the vehicle system may change and the engine operating parameters may need to be adjusted for improved vehicle performance and fuel efficiency. Details regarding road gradient determination and trailer classification will be discussed in relation to FIGS. 3 and 4.

A difference between a real-time and an expected road gradient estimated during different vehicle operating conditions may be utilized to determine one or more trailer characteristics. The real-time road gradient estimation may be carried out by a powertrain controller based on the wheel torque response of the vehicle system under different driving conditions (e.g., during acceleration/deceleration, steady speed operation, etc.). In one example, due to the electric machinery in the powertrain of a hybrid electric vehicle (HEV), an accurate estimation of a real-time road gradient may be carried out by a controller of a HEV vehicle.

As such, the trailer characteristics identified may vary based on the vehicle operating condition where the real-time road gradient was estimated. As an example, determining the trailer characteristics may include, during steady-state vehicle travel, determining a size of the trailer based on a difference between the real-time road gradient and the expected road gradient, the size increased as the real-time road gradient exceeds the expected road gradient. As another example, determining the trailer characteristics may include during vehicle acceleration, determining a weight of the trailer based on the difference between the real-time road gradient and the expected road gradient, the weight increased as the real-time road gradient exceeds the expected road gradient. As yet another example, determining the trailer characteristics may include during vehicle deceleration, determining a frontal area of the trailer based on a first change in the real-time road gradient relative to a second change in the expected road gradient, the frontal area increased as the first change exceeds the second change.

Figure 2C:
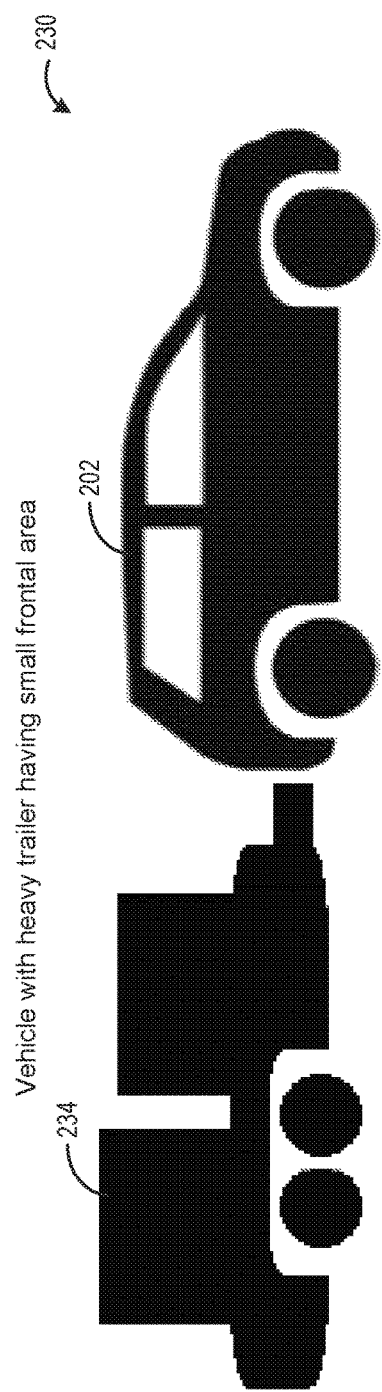
FIG. 2C shows an example vehicle system with a heavier weight trailer having a smaller frontal area coupled to the vehicle.
Figure 2D:
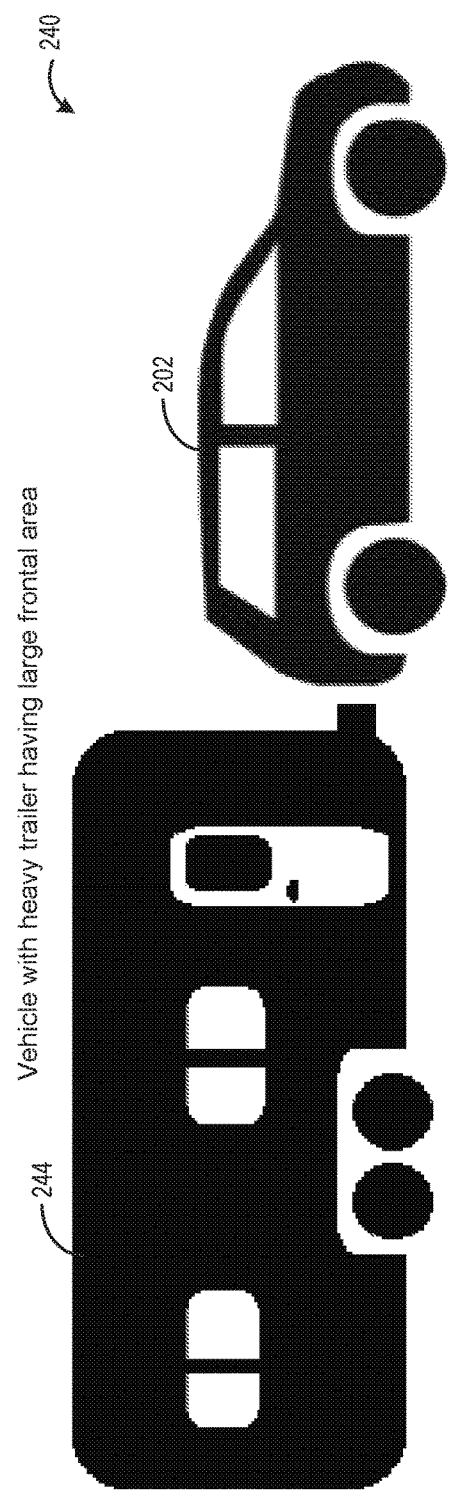
FIG. 2D shows an example vehicle system with a heavier weight trailer having a larger frontal area coupled to the vehicle.
Figure 3:
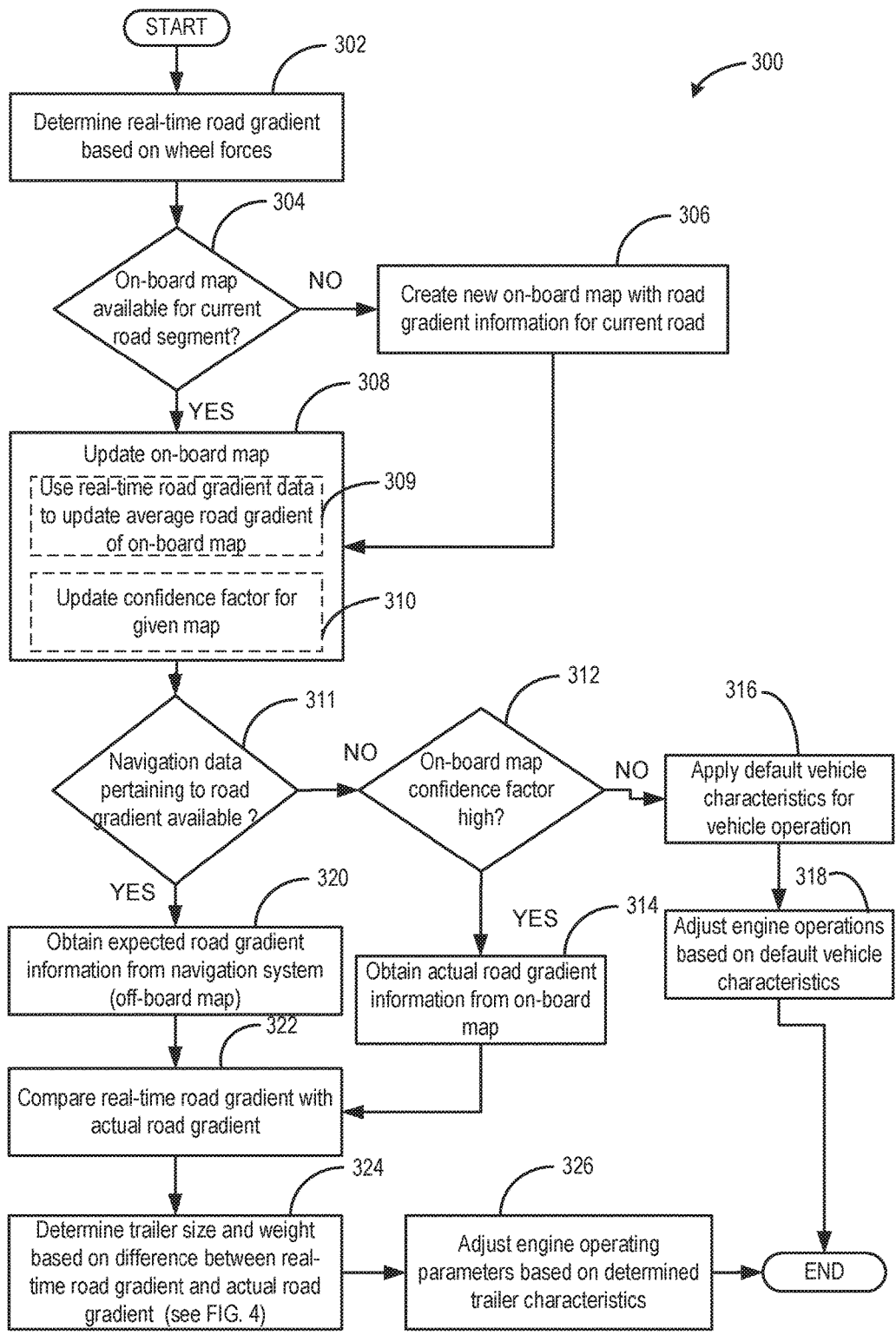
FIG. 3 shows a flow chart illustrating a method that may be implemented for determining the road gradient of a road segment in real-time during vehicle travel.
Figure 4:
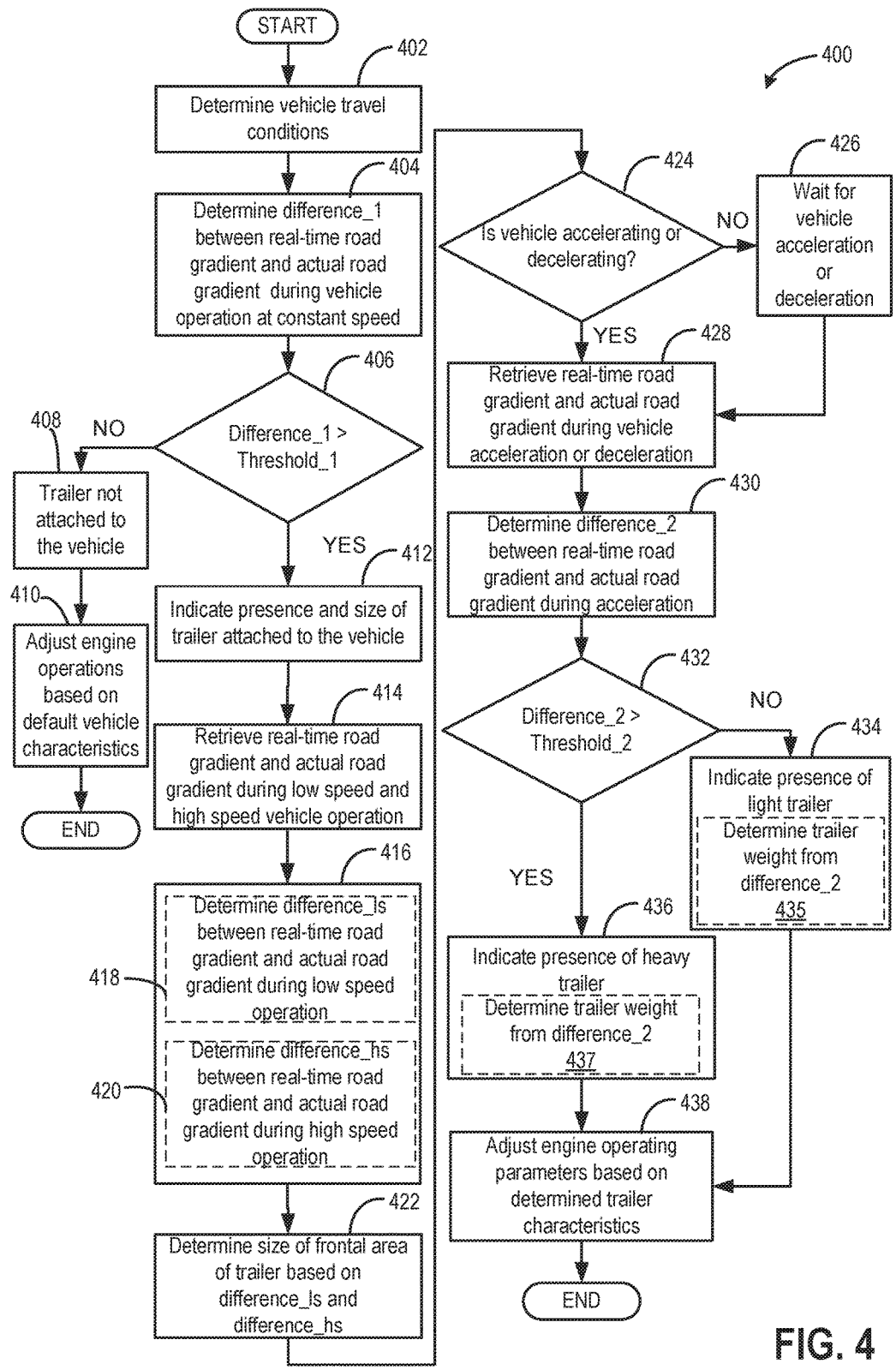
FIG. 4 shows a flow chart illustrating a method that may be implemented for determining trailer characteristics based on a comparison of real-time and expected road gradient estimations.

Example embodiments of trailers having have different characteristics (size, weight, size of frontal area) are shown in FIGS. 2A, 2B, 2C, and 2D and methods to differentiate between such trailers (based on road gradient estimations) are discussed with relation to FIGS. 3 and 4.

As used herein, a size of the trailer may refer to the dimension (height, breadth, and depth) and/or volume of the trailer calculated as a function of those dimensions. A trailer may be categorized to be having a smaller or a larger size depending on the dimensional parameters of the trailer and the size of the vehicle towing the trailer. As an example, a trailer having a length larger than a threshold length may be classified large while a trailer having a length smaller than the threshold length may be classified small. As another example, a trailer having a height larger than a threshold height may be classified large while a trailer having a height smaller than the threshold height may be classified small. As yet another example, a trailer having a volume larger than a threshold volume may be classified large while a trailer having a volume smaller than the threshold volume may be classified small. The threshold length, threshold height, and threshold volume may depend on the make, model, and category (e.g., a sedan, a pick-up truck, a commercial tow vehicle, etc.) of the vehicle towing the trailer. The respective thresholds may be defined as a percentage of the length, height, and volume of the towing vehicle. As used herein, a weight of the trailer may refer to a mass of the trailer. The mass of the trailer may include a load carried by the trailer. Based on the weight of the trailer and the category of vehicle towing the trailer, a trailer may be classified as a lighter or a heavier trailer. As an example, for a hybrid passenger vehicle, a weight of a "light" trailer attached to the vehicle may be around 400 lbs (10% of the vehicle curb weight) while a weight of a "heavy" trailer attached to the vehicle may be around 1000 lbs (25% of vehicle curb weight). For a heavy duty pick-up truck, a weight of a "light" trailer attached to the pick-up truck may be around 6000 lbs (100% of the vehicle curb weight) while a weight of a "heavy" trailer attached to the pick-up truck may be around 18,000 lbs (300% of vehicle curb weight). In case of certain commercial tow vehicles, a weight of a "light" trailer attached to the tow vehicle may be around 200% of the vehicle curb weight, while a weight of a "heavy" trailer attached to the tow vehicle may be at least 800% of the vehicle curb weight.

As used herein, a frontal area of the trailer may refer to a dimension of the frontal plane (face) of the trailer, including a projection of the cross-section of the trailer on the frontal plane, as well as a shape of the projection on the frontal plane. As an example, a trailer may have a smaller frontal area wherein the dimension of the face of the trailer is smaller compared to the overall dimension (height, breadth, and depth) of the trailer. In comparison, in a trailer having a larger frontal area, the face of the trailer is larger compared to the overall dimension (size) of the trailer. Additionally or alternatively, the frontal area may be an absolute size in meters squared. In one example, a trailer with a higher than threshold size of the frontal plane may be classified as a trailer having a large frontal area. The threshold size of the frontal area may depend on the overall size of the trailer and also on the make, model, and category (e.g., a sedan, a pick-up truck, a commercial tow vehicle, etc.) of the vehicle towing the trailer. The threshold may be defined as a percentage of the overall size of the trailer or that of the towing vehicle. The size of the frontal area may also be classified as a percentage of frontal plane of the trailer above the height of the towing vehicle. The size of the frontal area of a trailer may be indicative of an aerodynamic drag parameter or drag coefficient for the trailer.

As such, a trailer may have any size, weight, and size of frontal area, and the attributes may or may not be correlated. In one example, a smaller size may correlate with a lighter weight and a large frontal area. In another example, a larger size may correlate with a heavier weight and a smaller frontal area. However in other examples, a smaller sized trailer may be heavy and have a smaller frontal area, while a larger sized trailer may be light and have a larger frontal area.

As such, vehicle system 100 depicts an example vehicle 110 with an attached trailer 120 and the vehicle system components described herein is not limited to any specific vehicle system. The depicted vehicle 110 may be a hybrid passenger vehicle, a sedan, a sport utility vehicle (SUV), a pick-up truck, and a commercial towing truck. Also, the attached trailer 120 have any size, weight, and frontal area size. FIG. 2A shows a first example embodiment 200 of a trailer 204 attached to a vehicle 202. In this example, the trailer 204 may be a lighter trailer wherein the weight of the trailer is below a threshold weight. In one example, the trailer may be classified as lighter if the trailer weight is less than a threshold percentage of the curb weight of the vehicle 202 towing the trailer. In addition, the frontal area of the depicted trailer 204 may be small.

FIG. 2B shows a second example embodiment 210 of a trailer 214 attached to vehicle 202. In this example, the trailer 214 is a lighter trailer wherein the weight of the trailer is below the threshold weight. In this example, the lighter trailer 214 has a larger frontal area. The overall size (dimension) of the trailer 214 may be larger compared to that of the trailer 204 in FIG. 2A.

FIG. 2C shows yet another example embodiment 230 of a trailer 234 attached to a vehicle 202. In this example, the trailer 234 may be a heavier trailer wherein the weight of the trailer is above the threshold weight. In one example, the trailer may be classified as heavier if the trailer weight is more than a threshold percentage of the curb weight of the vehicle 202 towing the trailer. The weight of the trailer 234 may be higher than the weights of trailers 204 and 214 in FIGS. 2A and 2B respectively. Also, the trailer 234 may have a small frontal area. The overall size (dimension) of the trailer 234 may be larger compared to that of the trailer 204 in FIG. 2A and the trailer 214 in FIG. 2B.

FIG. 2D shows a further example embodiment 240 of a trailer 244 attached to a vehicle 202. In this example, the trailer 244 may be a heavier trailer wherein the weight of the trailer is above the threshold weight. The weight of the trailer 244 may be similar to the weight of the trailer 234 in FIG. 2C, and may be higher than the weights of trailers 204 and 214 in FIGS. 2A and 2B respectively. The trailer 244 may have a larger frontal area compared to the trailer 234 in FIG. 2C. In this way, trailers may having different characteristics including difference size, weight, and size of frontal area of the trailer. The overall size (dimension) of the trailer 244 may be larger compared to that of each of the trailer 204 in FIG. 2A, the trailer 214 in FIG. 2B, and the trailer 234 in FIG. 2C.

As such, based on the weight, size, and size of frontal area of the trailer, wheel contact forces generated on the wheels of a vehicle towing the trailer may vary. As elaborated herein, trailers 204, 214, 234, and 244 having different characteristics may be differentiated based on an estimated real-time road gradient relative to an expected road gradient. The real-time road gradient information (road gradient estimated from the wheel contact forces of the towing vehicle) along with expected road gradient information (including information from off-board or on-board maps) of a currently travelled road segment may be used to reliably determine the specific trailer characteristics including details of size, weight and size of frontal area of the trailer. The determination includes estimating a first vehicle mass based on the real-time road gradient, estimating a second vehicle mass based on the expected road gradient, and inferring the one or more characteristics of the trailer based on the first vehicle mass relative to the second vehicle mass, the one or more characteristics including a trailer size, a trailer weight, and a trailer frontal area. Based on the determined trailer characteristics, during vehicle travel, engine performance may be optimized for the specific kind of trailer, thereby improving driving experience, drivetrain temperature management, and fuel efficiency. Example methods to differentiate between such trailers are discussed in details with relation to FIGS. 3 and 4.

FIGS. 1 and 2A-2D show examples of trailer and vehicle systems with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example.

In this way, the system of FIGS. 1 and 2A-2D provide for a vehicle with an engine, a transmission with a plurality of gearsets, the transmission coupling the engine to vehicle wheels, a trailer attached to the vehicle; a navigation system communicatively coupled to each of the vehicle and an off-board server; and a controller. The controller may be configured with computer readable instructions stored on non-transitory memory for: during vehicle travel over a road segment, estimating a real-time road gradient based on one or more of engine torque, powertrain torque, and gear ratio, comparing the real-time road gradient with an expected road gradient retrieved via the navigation system, inferring one or more characteristics of the trailer based on the comparing, and adjusting a shift schedule of the transmission based on the inferred characteristics. The expected road gradient may be a first off-board expected road gradient estimate. The vehicle controller may further update an on-board expected road gradient estimate based on the real-time road gradient, and a confidence factor of the on-board expected road gradient estimate based on a number of completed trips over the road segment.

FIG. 3 illustrates an example method 300 that may be implemented for determining the road gradient of a road segment based on wheel contact forces of an on-road vehicle, and further determining the characteristics of a trailer being towed by the vehicle. The method enables vehicle towing performance to be optimized. Instructions for carrying out method 300 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 302, a gradient of a road segment on which a vehicle is travelling may be determined in real-time based on an estimated wheel contact force. The road gradient information may include data relating to the elevation profile of the road, such as a number of inclines, declines, and flat sections, their lengths, as well as estimated time required to travel through them. In order to determine real-time road gradient, current wheel torque may be estimated by a powertrain controller based on one or more of engine torque, powertrain torque, and gear ratio estimations that translate the torque estimation of a prime mover (such as an engine, motor, or combinations thereof) through the drivetrain to a torque at one or more of or each of the driving wheels. The powertrain controller may then measure the vehicle response during a current driving condition (e.g., during acceleration/deceleration, steady speed operation, etc.) of the vehicle. The measured vehicle response (during a certain driving condition) is then compared to an expected vehicle response for the given (current) wheel torque production. The difference between the expected and measured vehicle response is then used to estimate the real-time road gradient for the road segment. In case of a trailer attached to the vehicle, the wheel contact forces of the vehicle may vary based on the presence of a towed trailer, as well as the size, weight, and size of frontal area of the trailer.

At 304, the routine includes determining if an on-board map containing road gradient information is available for the current road segment (that is, the segment of road the vehicle is currently travelling on). An on-board map may be a map stored in the memory of the vehicle controller with data relating to road conditions. The on-board map may include details regarding a selected route such as road conditions, road gradients, etc. In one example, an on-board map of a frequently travelled road segment may be created, updated, and stored in the controller memory. In another example, a map may be retrieved from external sources and stored in the controller memory for future use as an on-board map. Such on-board maps may be utilized for navigation and/or determination of road gradient of a road segment. Based on the determined road gradient, characteristics of a trailer attached to a vehicle may be estimated especially during unavailability of a reliable off-board map (that is, a map which is obtained from a source external to the vehicle via a navigation system, wireless communication with a cloud network, vehicle to vehicle communication etc.).

If it is determined that an on-board map is not available for the current road segment, at 306, a new on-board map may be opportunistically created for the current road segment if sufficient data is collected during travel over the current road segment. The road gradient information (as determined from wheel contact forces, in step 302) for the current road segment may be included in the on-board map for future reference.

If it is determined at 304 that an on-board map is available for the current road segment, at 308, the on-board map may be updated. Updating the on-board map includes, at 309, using the real-time road gradient information, as estimated based on the wheel contact forces, in order to update an average road gradient information for the given road segment as stored in the on-board map. Updating the on-board map further includes, at 310, updating a confidence factor of the given on-board map. In addition, the real-time gradient may be uploaded to an off-board server and an expected road gradient may be updated based on the real-time gradient. An expected road gradient includes the road gradient information of the road surface (including information relating to road elevation and occurrences of flat road surfaces, inclines, declines etc.). The expected road gradient information may be obtained from an external source such as a navigation system and/or a network cloud. The expected road gradient is not dependent on any factors relating to the vehicle system. As discussed earlier, a real-time road gradient includes an estimate of road gradient as determined from the wheel contact forces of the vehicle. The real-time road gradient estimation may be influenced by the characteristics (size, weight, size of frontal area of the trailer) of a trailer attached to the vehicle. Therefore, based on the trailer characteristics there may be a difference between the real time and the expected road gradient.

For a newly created on-board map, the confidence factor of the map may be low as the information obtained during a single drive may not be fully representative of the expected road conditions. This is due to variations in estimated wheel contact forces based on factors such as the presence of a trailer attached to the vehicle (affecting the wheel contact forces of the vehicle) and/or changes in road conditions (such as the map being learned during temporary road conditions, such as during road repair work). Every time the vehicle travels on the same road segment, a new dataset including road gradient information may be collected and the on-board map may be updated based on the new dataset. In one example, the road gradient information stored in the on-board map may be based on a statistical average of measurements collected on each available dataset. Also as the number of datasets available for updating the road gradient increases, the confidence factor of the on-board map (for the given road segment) also increases. Once the confidence factor increases to higher than a threshold level, the on-board map may be used alongside or in place of an off-board (externally obtained) map for obtaining road gradient information for a road segment. Alternatively, a weighted average of parameters learned via the on-board map and the off-board map may be used for determining road gradient information, and trailer characteristics.

At 311, the routine includes determining if navigation data pertaining to a road gradient is available for the current road segment. This includes determining if navigation data including the road gradient information can be retrieved from one or more sources external to the vehicle. The navigation data pertaining to a road gradient includes information relating to occurrences of flat road surfaces, inclines, declines, the length of such road surfaces and the estimated time to travel through the different road elevations. The one or more sources external to the vehicle may include a global positioning system (GPS) and a network cloud or server (such as a network cloud 153 in FIG. 1). In one example, it may be determined if it is possible to obtain road gradient information for the current road segment via wireless communication with an external server. Additionally or optionally, it may be determined if it is possible to obtain road gradient information for the current road segment by the wireless communication device of the vehicle (such as the wireless communication device 155 of FIG. 1) communicating with other similar vehicles via vehicle to vehicle (V2V) technology. The similar vehicles may be part of a common fleet of vehicles, vehicle of a similar make, and/or model, vehicles operational within a threshold radius of the given vehicle, or combinations thereof.

If it is determined that navigation data is available for the current road segment, at 320, an expected road gradient map (off-board map) for the current road segment as well as one of more future road segments (such as an entire travel route of the vehicle) may be obtained/received from an external source by using a navigation system (such as by using global positioning system (GPS) co-ordinates of the vehicle). In one example, the expected road gradient is received from a navigation system located on-board the vehicle, the navigation system communicatively coupled to a control system of the vehicle. The navigation system may be further communicatively coupled to an off-board server wherein the expected road gradient is downloaded at the vehicle from the off-board server via the navigation system. In other examples, the controller of the vehicle may directly obtain the road gradient information from other external servers by use of wireless technology. Also, the vehicle may utilize a wireless communication device of the vehicle to retrieve road gradient information from similar vehicles (operational within a radius) via V2V technology.

If it is determined at 312 that navigation data is not available to obtain current road gradient information, at 312, the routine includes determining if the confidence factor of the on-board map is high. If it is determined that the confidence factor is higher than a threshold level, the on-board map may be used. Under such circumstances, at 314, expected road gradient information is obtained from the on-board map. This data is based on an average road gradient information as estimated using multiple datasets obtained from a plurality of trips on the same road segment.

At 322, the real-time road gradient (as determined at step 302) may be compared to the expected road gradient as obtained from either an off-board map (at step 320) or an on-board map (at step 314). Based on the comparison between the real-time and expected road gradient, at 324, characteristics of a trailer (if any) attached to a vehicle may be determined. This includes determining the presence of a trailer, and if a trailer is attached, determining one or more of trailer size (dimension or volume of the trailer), trailer weight (mass of the trailer), and size of frontal area (dimension of the frontal plane). As such, for a trailer, based on size, weight, and size of frontal area, wheel contact forces at the towing vehicle system may change. The wheel contact forces at the towing vehicle may further change based on the vehicle speed and instantaneous road conditions. Due to change in wheel contact forces there may be significant differences between the real-time and expected road gradient. Such differences may be utilized to infer the characteristics of the attached trailer. Details of trailer characteristics determination is discussed in relation to FIG. 4.

Based on the determined characteristics of the trailer, at 326, engine operating parameters may be adjusted in order to optimize engine performance of the vehicle and trailer system. A plurality of powertrain controls may be adjusted based on the type of trailer being towed. As no-limiting examples, adjusting vehicle operating parameters include adjusting one or more of a transmission gear shift schedule, engine fuel usage, and vehicle stability and sway control. In one example, a gear shifting schedule may be adapted to the increased weight of the vehicle and trailer system. Adjustments to the gear shift schedule includes holding in a current gear longer and delaying a gear shift (e.g., staying in a lower gear for a longer duration and delaying the upshift to a higher gear), thereby preventing the transmission from frequently switching back and forth between different gears (a phenomenon referred to as hunting). In another example, by having an estimate of the trailer characteristics and by knowing the vehicle travel route, a priori, it may be possible to better estimate fuel consumption over the trip and provide information regarding fuel availability (e.g., mileage range of each fuel in the fuel tank) to the operator. Also, temperature management of the powertrain and emissions quality may be better regulated. For example, in anticipation of engine overheating and knock during trailer towing on an extended incline, or in the presence of low ambient humidity, more fuel may be delivered to the engine via direct injection. By determining the size of the trailer frontal area, an improved estimate of the amount of power to be delivered by the vehicle for towing the trailer at different vehicle speeds may be determined. Additionally, engine cam timing, maximum vehicle speed, speed control feed forward gain adjustment, powertrain cooling actions, diesel exhaust fluid usage estimation, engine oil change interval estimation, and manual transmission shift indicator to a driver may be adjusted based on the determined trailer characteristics. Also, for hybrid electric vehicles, high voltage battery charge/discharge scheduling, engine on/off requests, plug-in high voltage battery range estimation may be influenced by the determined characteristics of an attached trailer.

In this way, an average road gradient estimate for a road segment on-board a vehicle may be generated based on wheel contact forces during vehicle travel, and a confidence factor for the average road gradient estimate may be increased as a number of trips over the road segment increases. Responsive to the confidence factor higher than a threshold, characteristics of a trailer attached to the vehicle may be determined based on the average road gradient estimate, and vehicle operation may be adjusted responsive to the trailer characteristics to better account for the towing requirements.

FIG. 4 illustrates an example method 400 that may be implemented for inferring trailer characteristics (size, weight, size of frontal area) based on a comparison of an estimated real-time road gradient to an externally obtained expected road gradient. A vehicle system may comprise a vehicle with an attached trailer. A trailer may be of smaller or larger size, wherein the size of the trailer may be defined as the dimension or volume of the trailer. Similarly, the trailer may be classified as a lighter or a heavier trailer, wherein the weight of the trailer may be defined as a mass or load of the trailer. Also, a size of a frontal area of the trailer may vary based on the dimension of the frontal plane of the trailer. A trailer may comprise a small or a large frontal area.

At 402, current travel conditions of the vehicle system including real-time road gradient information may be determined for the road segment. As described in FIG. 3, the real-time road gradient may be estimated from wheel contact forces of the vehicle system during different driving conditions (such as during travel at a steady-state speed and during acceleration/deceleration events). In order to determine real-time road gradient, current wheel torque may be estimated by a powertrain controller based on one or more of engine torque, powertrain torque, and gear ratio estimations. The powertrain controller may then measure the vehicle response during a current driving condition of the vehicle. The measured vehicle response may then be compared to an expected vehicle response for the given (current) wheel torque production. The difference between the expected and measured vehicle response may then be used to estimate the real-time road gradient for the road segment. In addition, the expected road conditions including the expected road gradient information may be obtained from an off-board map (via navigation system, wireless communication, and/or vehicle to vehicle technology) and/or from an on-board map. As previously described in FIG. 3, for the on-board map, generation of the average road gradient estimate includes determining a real-time road gradient estimate on each trip of the number of trips over the road segment (each trip includes driving over a same road segment every time), and calculating a statistical average of each real-time road gradient estimate. Responsive to the confidence factor lower than a threshold, an expected road gradient estimate may be received from an off-board server. On a given trip (over the same road segment), the trailer characteristics may be determined based on the average road gradient estimate relative to the real-time road gradient estimate.

At 404, during a period of travel when the vehicle is operating at a steady-state speed, a difference (difference_1) between the real-time (estimated by the vehicle controller) and the expected road gradient may be determined. Any difference between the real-time and the expected road gradient may be attributed to the presence of the trailer, the difference varying based on one or more of the size, weight, and size of frontal area of the trailer (if being towed) attached to the vehicle. If the vehicle is not towing a trailer, the real-time road gradient may be substantially equal to the expected road gradient.

At 406, the routine includes determining if the difference_1 is greater than a first threshold (threshold_1). The first threshold may represent a margin of error in the determination of the real-time road gradient. If the real-time road gradient estimate is significantly different from the expected road gradient, the difference_1 may be higher than the margin of error. If it is determined that the difference_1 is less than the threshold, at 408, it may be inferred that the real-time road gradient is not significantly different from the expected road gradient and therefore it may be inferred that a trailer is not attached to the vehicle. The vehicle controller may infer that the current weight of the vehicle does not include any additional weight from a trailer, which in turn does not affect the wheel contact forces used for real-time road gradient estimation. At 410, the engine operating parameters may be adjusted based on the default vehicle characteristics. Any further adjustments due to an attached trailer may not be necessary at this time.

If it is determined (at 406) that the difference_1 is greater than the threshold_1, at 412, it may be inferred that the real-time road gradient is different from the expected road gradient and therefore a trailer may be attached to the vehicle. The size of the trailer may be determined from the magnitude of the difference_1 as well as the vehicle speed profile during conditions when the real-time road gradient was estimated. If the difference_1 is higher than a second threshold, it may be inferred that the trailer is a large trailer (of large size, dimension, or volume). Similarly, if difference_1 is lower than the second threshold, it may be inferred that the trailer is a small trailer (of small size, dimension, or volume). The second threshold may be based on vehicle attributes, such as the make, model, and category of the vehicle towing the trailer. Once it is confirmed that a trailer is attached to the vehicle and the size of the trailer is determined, the controller may proceed to further determine one or more other characteristics (such as weight, frontal area, etc.) of the trailer.

At 414, real-time road gradient may be estimated from wheel contact forces during each of a low speed operation and a high speed operation of the vehicle system. The low and high speed may correspond to two predetermined speeds (or ranges of speed). At the same time, the expected road gradient information may be retrieved from either an off-board map or an on-board map of the current road segment. At 416, a difference may be calculated between the real-time and expected road gradient. Calculation of the difference between the real-time and the expected road gradient includes, at 418, determining a first difference (difference_ls) between the real-time and expected road gradient estimated during low speed operation of the vehicle system. Calculation of the difference may further include, at 420, determining a second difference (difference_hs) between the real-time and expected road gradient estimated during high speed operation of the vehicle system. As aerodynamic drag is proportional to a size of the trailer's frontal area and the square of the vehicle system speed, a trailer (coupled to the vehicle) with larger frontal area may be more significantly affected by aerodynamic drag during high speed operation compared to a trailer with a smaller frontal area. By comparing difference_ls (estimated during low speed operation) and difference_ls (estimated during high speed operation), it may be possible to determine if the trailer attached to the vehicle has a smaller or a larger frontal area.

At 422, the two differences between real-time road gradient and expected road gradient (difference_ls and difference_hs) as calculated during low and high speed vehicle operations respectively, may be compared. If the trailer attached to the vehicle has a small frontal area, the difference between real-time and expected road gradient may not change appreciably between low speed and high speed operation due to low aerodynamic drag. Therefore, if it is determined that there is no significant difference between difference_ls and difference_hs (e.g., is, the difference between difference_ls and difference_hs is lower than a threshold difference), it may be inferred that the frontal area of the trailer attached to the vehicle is small. If the trailer attached to the vehicle has a large frontal area, the difference between real-time and expected road gradient may change significantly between low speed and high speed operation due to high aerodynamic drag. If it is determined that there is a significant difference between difference_ls and difference_hs (e.g., the difference between difference_ls and difference_hs is higher than the threshold difference), it may be inferred that the frontal area of the trailer attached to the vehicle is large. In this way, based on a difference between real-time and expected road gradient as estimated during low and high speed operations of the vehicle system, it is possible to determine the size of the frontal area of the trailer.

In an alternate example, determination of the size of the frontal area may be carried out during deceleration events. During decelerations, as the speed of a vehicle system decreases (from high to low speed), a difference between the real-time and the expected road gradient may change due to change in aerodynamic drag. If the change is higher than a threshold change it may be inferred that the trailer has a large frontal area (larger aerodynamic drag) and if the change is lower than the threshold change, it may be inferred that the trailer has a small frontal area (smaller aerodynamic drag). In this way, frontal area of the trailer may be determined based on a first change in the real-time road gradient relative to a second change in the expected road gradient during vehicle deceleration over the road segment, the inferred frontal area increased as the first change exceeds the second change.

At 424, the routine may include determining if the vehicle system is accelerating or decelerating during a period of time. The difference between real-time and expected road gradient as estimated during an acceleration (or deceleration) event may be used to determine the overall size and weight of the vehicle. As inertia is directly proportional to the weight and size of a body, a vehicle coupled to a trailer with higher weight and larger size may take longer to accelerate over a given road gradient compared to a vehicle coupled to a trailer with lower weight and smaller size. If it is determined that the vehicle system is not currently accelerating or decelerating, at 426, the controller may wait for acceleration or deceleration events in order to continue with the classification of the trailer.

If it is determined that the vehicle system is accelerating (or decelerating), at 428, real-time road gradient may be estimated from wheel contact forces during acceleration (or deceleration) of the vehicle system. At the same time, the expected road gradient information may be retrieved from either an off-board map or an on-board map of the current road segment.

At 430, a difference (difference_2) may be determined between the real-time and expected road gradient during acceleration (or deceleration).

At 432, the routine includes determining if difference_2 is greater than a threshold_2. The threshold_2 may vary based on the weight of the vehicle towing the trailer and the expected road gradient. In one example, the threshold_2 may be based on a percentage of the curb weight of the vehicle towing the trailer. Based on the magnitude of difference_2, a weight of the trailer may be estimated. The weight of the trailer is directly proportional to the difference between a real-time road gradient and an expected road gradient. Said another way, a first vehicle mass may be estimated based on the real-time road gradient and a second vehicle mass may be estimated based on the expected (expected) road gradient, and the weight of the trailer may be inferred based on the first mass relative to the second mass, the inferred weight increased as the first mass exceeds the second mass. If the trailer attached to the vehicle is lighter, due to less inertia, the difference between the real-time and expected road gradient during acceleration (or deceleration) may be smaller compared to the difference in case of a heavier trailer.

If it is determined that the difference_2 is less than the threshold_2, at 434, it may be inferred that a light trailer (with small inertia) is attached to the vehicle system. In addition, based on the magnitude of difference_2, at 435, the weight of the trailer may be estimated. If it is determined that the difference_2 is greater than the threshold_2, at 436, it may be inferred that a heavy trailer (with large inertia) is attached to the vehicle system. Similarly, at 437, the weight of the attached trailer may be estimated from the magnitude of difference_2.

As previously described in FIG. 3 (step 326), at 438, engine operating parameters may be adjusted based on the determined characteristics of the trailer, in order to optimize engine performance, fuel efficiency and exhaust quality of the vehicle and trailer system. Adjusting of engine operating parameters may include delaying the transmission gearshift when the trailer weight is higher or maintaining a lower gear at high vehicle speeds when the frontal area of the trailer is larger. In this way, a size of a trailer may be inferred based on a difference between the real-time road gradient and the expected road gradient during vehicle travel at a steady state speed over the road segment, the inferred size increased as the real-time road gradient exceeds the expected road gradient. Also, a weight of the trailer may be inferred based on a difference between the real-time road gradient and the expected road gradient during vehicle acceleration over the road segment, the inferred weight increased as the real-time road gradient exceeds the expected road gradient. In addition, size of a frontal area of the trailer may be inferred based on a first difference between the real-time road gradient and the expected road gradient during vehicle travel at a higher steady state speed relative to a second difference between the real-time road gradient and the expected road gradient during vehicle travel at a lower steady state speed, the frontal area increased as the first difference exceeds the second difference.

FIG. 5 shows an example differentiation between a small and a large trailer based on a difference between an estimated real-time and an expected road gradient of a road segment at 500. Three vehicle systems, travelling at a steady-state speed over a road segment, may be compared to determine the size (dimension or volume) of a trailer attached (if any) to each of the vehicle systems. Road gradient data for a first vehicle system including only a vehicle 502 is compared to a second vehicle system 504 including a small trailer attached to vehicle 502, and a third vehicle system 506 including a larger trailer attached to vehicle 502. Depending on the size of the trailer attached to the vehicle, a difference between a real-time road gradient (estimated from vehicle wheel contact forces) and an expected road gradient (obtained from external source or on-board map) may vary.

The first plot 508 shows a change in elevation profile of a road segment over which the vehicle is travelling over time, wherein the x-axis represents time. A navigation system coupled to the vehicle system may be used to obtain expected road gradient information for a road segment travelled by the vehicle. In addition, the expected road gradient information for the entire route of the vehicle's journey may be obtained and stored in the controller's memory as an off-board map of the route. Additionally or optionally, the vehicle system may comprise a wireless communication device for direct communication with a network cloud (external server) in order to retrieve expected road gradient information. Additionally or optionally, the wireless communication device may be used to communicate with other similar vehicle systems via vehicle to vehicle (V2V) technology. The vehicles may be part of a common fleet of vehicles, vehicle of a similar make, and/or model, vehicles operational within a threshold radius of the given vehicle, or combinations thereof. Using the wireless communication device and/or V2V technology, the vehicle system may directly retrieve expected road gradient information from an external server or other similar vehicles. In the absence of external data (off-board map) with road gradient information, an on-board map with high level of confidence may be used to obtain expected road gradient information for the road segment.

At map 550, road gradient estimations relative to a flat road surface, as inferred from wheel contact forces and as obtained from an off-board map or an on-board map, are depicted at plots 510-514. The vertical (y-axis) represents a road gradient relative to a flat road surface (in percentage). The horizontal (x-axis) denotes time and the vertical markers t1-t4 identify significant times in trailer characteristics determination. The plot 510 shows the expected road gradient (obtained from an off-board or an on-board map). The expected road gradient (plot 510) may be similar to the road gradient as estimated from the wheel contact forces of a calibrated vehicle system without any attached trailer (such as vehicle system 502). The plot 512 shows a real-time road gradient estimated from wheel contact forces of a vehicle system with a small trailer (such as vehicle system 504). The plot 514 shows a real-time road gradient estimated from wheel contact forces of a vehicle system with a large trailer (such as vehicle system 506).

The difference between the road gradient estimates of the two trailer systems is based on a difference in inertia and aerodynamic drag due to different sizes and weights of the attached trailer. The larger the trailer, the higher is the influence of inertia and aerodynamic drag, especially during high speed operation. Therefore, the larger the trailer, the more pronounced (bigger) is the difference between the expected road gradient and the road gradient estimate from the vehicle. As such, the size of the frontal area of the vehicle directly affects the aerodynamic drag on the vehicle whereas the mass of the vehicle affects the inertial drag on the vehicle. The difference between an expected road gradient (line 510) and a real-time road gradient (line 512) as estimated by a controller of the second vehicle system 504 is denoted by ΔG1. Similarly, the difference between an expected road gradient (line 510) and a real-time road gradient (line 514) as estimated by a controller of the third vehicle system 506 is denoted by ΔG2.

Prior to time t1, as seen from plot 508, the road elevation does not change appreciably. As seen from the plots 510, 512 and 514, during operation on flat road surfaces, the road gradient estimates by each of a vehicle system with a small trailer (504) and a vehicle system with a large vehicle trailer (506) is not significantly different from an expected road gradient estimate as obtained from an off-board or an on-board map. Therefore, the difference may not be used to determine the size of the trailer.

At time t1, there is an increase in road elevation (upward slope in the road). Due to the change in elevation (upward slope on the road), as the vehicles climb the slope, each of the vehicle systems with the light and heavy trailers experience different effects of inertia and aerodynamic drag, proportional to their trailer size. Therefore, during this time period, the real-time road gradient estimates for the vehicle system with a small trailer and the vehicle system with a large trailer are significantly different from corresponding expected road gradient estimates as obtained from an off-board or an on-board map. Between time t1 and t2, at an elevated road segment, the difference (ΔG1) between an expected road gradient (line 510) and a real-time road gradient (line 512, for vehicle system 504) may be compared to a threshold difference. If the difference (ΔG1) is lower than the threshold, it may be inferred that the trailer is a small trailer. Similarly, the difference (ΔG2) between an expected road gradient (line 510) and a real-time road gradient (line 514, for vehicle system 506) may be compared to the threshold difference. If the difference (ΔG2) is greater than the threshold, it may be inferred that the trailer is a large trailer. In this example, based on the differences ΔG1 and ΔG2, it may be inferred that the vehicle system 504 includes a small trailer attached to a vehicle and the vehicle system 506 includes a large trailer attached to a vehicle.

Between time t2 and t3, as seen from plot 508, the road elevation does not change appreciably. During this time, the difference between the plots 510, 512 and 514 remains constant. At time t3, as the elevation of the road changes, the expected road gradient and the road gradient estimations by the respective vehicle systems change accordingly. Between time t3 and t4, due to the change in elevation (downward slope on the road), as the vehicles travel down the slope, each of the vehicle systems with the light and heavy trailers experience different effects of inertia and aerodynamic drag, proportional to their size. Therefore, during this time period, the road gradient estimates by each of a vehicle system with a small trailer and a vehicle system with a large trailer is significantly different from an expected road gradient estimate as obtained from an off-board or an on-board map. Once again, at time t4, no further change is observed in road elevation. After time t4, the difference between the plots 510, 512 and 514 may remain constant.

In this way, during steady-state vehicle travel, a size of the trailer may be determined based on a difference between the real-time road gradient and the expected road gradient, the size increased as the real-time road gradient exceeds the expected road gradient. Based on the determined size of the trailer, engine operations may be adjusted for optimal engine and vehicle performance.

FIG. 6 shows an example 600 differentiation between a light (less mass) and a heavy (more mass) trailer based on a difference between an estimated real-time and an expected road gradient of a road segment. Three vehicle systems, travelling over a road segment, may be compared to determine the weight (mass) of a trailer attached (if any) to each of the vehicle systems. The first vehicle system 602 may comprise the vehicle used to tow a trailer. In this example vehicle system 602 does not have any trailer attached to it. The second vehicle system 604 may comprise a vehicle similar to the vehicle 602 and a light trailer attached to the vehicle. The third vehicle system 606 may comprise a vehicle similar to the vehicle 602 and a heavy trailer attached to the vehicle. As such, the differentiation between a light and a heavy trailer may depend on the weight of the trailer (for each of the vehicle systems 604 and 606) in relation to the curb weight of the vehicle 602 towing the trailer. In one example, if the weight of the attached trailer is lower than a threshold percentage of the weight of the towing vehicle 602, the trailer may be classified a light trailer whereas if the weight of the attached trailer is higher than the threshold percentage of the curb weight of the towing vehicle 602, the trailer may be classified a light trailer. Depending on the weight of the trailer attached to the vehicle, there may be a difference between the real-time (estimated from vehicle wheel contact forces) and the expected road gradient (obtained from external source or on-board map).

The first plot 608 shows an elevation profile of an expected road surface (of a road segment) over time (x-axis represents time). The second plot 610 shows a change in vehicle speed over time as the vehicle systems travel over a road segment. The group of plots 650 show real-time road gradient estimations relative to a flat road surface, as inferred from wheel contact forces and as obtained from an off-board map or an on-board map. The vertical (y-axis) represents a road gradient relative to a flat road surface (in percentage). The horizontal (x-axis) denotes time and the vertical markers t1 and t2 identify significant times in trailer weight determination. The plot 612 shows the expected road gradient obtained from an off-board or an on-board map. The expected road gradient (plot 612) may be very similar to the real-time road gradient estimated from the wheel contact forces of a vehicle system without any attached trailer (such as vehicle system 602). The plot 614 shows a real-time road gradient as estimated from wheel contact forces of the second vehicle system 604. The plot 616 shows a real-time road gradient as estimated from wheel contact forces of the third vehicle system 606.

The difference between real-time and expected road gradient as estimated during acceleration (or deceleration) may be used to determine the weight of the trailer attached to a vehicle system. As inertia is directly proportional to the weight of a body, a vehicle coupled to a trailer with higher weight may take longer to accelerate over a same road segment compared to a vehicle coupled to a trailer with lower weight. Also, the difference between the wheel contact forces of the two vehicle systems (providing different estimates of road gradient) is based on a difference in inertia due to different weights of the attached trailers. The heavier the trailer, the higher is the influence of inertia (especially during acceleration and deceleration). Therefore, heavier the trailer, the more pronounced (bigger) is the difference between the expected road gradient and the road gradient estimate from the vehicle during acceleration and deceleration events. In this example, the difference between an expected road gradient (line 612) and a real-time road gradient (line 614) as estimated by a controller of the second vehicle system 604 is denoted by ΔW1. Similarly, the difference between an expected road gradient (line 612) and a real-time road gradient (line 514) as estimated by a controller of the third vehicle system 606 is denoted by ΔW2.

As seen from plot 608, the road elevation does not change appreciably throughout the road segment. Prior to time t1, the vehicle speed also does not change significantly. As seen from the plots 612, 614, and 616, during operation at steady-state speed, the road gradient estimates for each of a vehicle with a light trailer and a vehicle with a heavy vehicle trailer is not significantly different from an expected road gradient estimate as obtained from an off-board or an on-board map. However the difference at this time may not be significant enough to determine the weight of the respective trailers. Between time t1 and t2, there is an increase in vehicle speed. Said another way, the vehicle systems accelerate between time t1 and t2. Due to the acceleration, each of the vehicle systems with the light and heavy trailers experience different effects of inertia, proportional to their size. Therefore, during this time period, the road gradient estimates by each of a vehicle with a light trailer and a vehicle with a heavy trailer is significantly different from an expected road gradient estimate as obtained from an off-board or an on-board map.

During acceleration, between time t1 and t2, the difference (ΔW1) between an expected road gradient (line 612) and a real-time road gradient (line 614) may be utilized to estimate the weight of the trailer in the vehicle system 604. Similarly, the difference (ΔW2) between an expected road gradient (line 612) and a real-time road gradient (line 616) may be utilized to estimate the weight of the trailer in the vehicle system 606. The estimated weights of each of the trailers included in the vehicle systems 604 and 606 may be compared to a threshold weight in order to determine if the trailer is a light or a heavy trailer. If the estimated weight is higher than the threshold, it may be inferred that the trailer is a heavy one whereas, if the estimated weight is lower than the threshold, it may be inferred that the trailer is a light one. In this example, based on the estimated weights of the trailers included in the vehicle systems 604 and 606, it may be inferred that the vehicle system 604 includes a light trailer attached to the vehicle and the vehicle system 606 includes a heavy trailer attached to the vehicle.

After time t2, the vehicle may operate at a steady-state speed with no further acceleration. As seen from the plots 612, 614, and 616, during operation at steady-state speed, a constant difference between the road gradient estimates by each of a vehicle with a light trailer and a vehicle with a heavy vehicle trailer and an expected road gradient estimate as obtained from an off-board or an on-board map, is continued to be observed.

In this way, during vehicle acceleration, a weight of the trailer may be determined based on the difference between the real-time road gradient and the expected road gradient, the weight increased as the real-time road gradient exceeds the expected road gradient. Based on the determined weight of the trailer, engine operations may be updated for optimal engine and vehicle performance.

FIG. 7 shows an example 700 differentiation between a trailer with a small frontal area and a trailer with a large frontal area based on a difference between an estimated real-time and an expected road gradient of a road segment during low speed and high speed operation. The size of the frontal area of a trailer may provide an estimate of an aerodynamic drag co-efficient for the trailer. Three vehicle systems, travelling over a road segment at two different speeds (first at a lower speed and then at a higher speed), may be compared to determine the size of a frontal area of a trailer attached (if any) to each of the vehicle systems. The first vehicle system 702 may comprise the vehicle used to tow a trailer. In this example vehicle system 702 does not have any trailer attached to it. The second vehicle system 704 may comprise a vehicle similar to the vehicle 702 and a trailer with a small frontal area attached to the vehicle. The third vehicle system 706 may comprise a vehicle similar to the vehicle 702 and a trailer with a large frontal area attached to the vehicle. Depending on the size of the frontal area of the trailer attached to the vehicle, the difference between the real-time (estimated from vehicle wheel contact forces) and the expected road gradient (obtained from external source or on-board map) during low speed and high speed operation, may be different.

The first plot 708 shows an elevation profile of an expected road surface (of a road segment) over time (x-axis represents time). The second plot 710 shows a change in vehicle speed over time as the vehicle systems travel over a road segment. The group of plots 750 show real-time road gradient estimations relative to a flat road surface, as inferred from wheel contact forces and as obtained from an off-board map or an on-board map. The vertical (y-axis) represents a road gradient relative to a flat road surface (in percentage). The horizontal (x-axis) denotes time and the vertical marker t1 identifies a significant time in trailer weight determination. The plot 712 shows the expected road gradient obtained from an off-board or an on-board map. The expected road gradient (plot 712) may be very similar to the road gradient estimated from the wheel contact forces of a first vehicle system without any attached trailer (such as vehicle system 702). The plot 714 shows a real-time road gradient as estimated from wheel contact forces of the second vehicle system (such as vehicle system 704). The plot 716 shows a real-time road gradient as estimated from wheel contact forces of the third vehicle system (such as vehicle system 706). A low speed of operation of the vehicle systems may be denoted by V1 and a high speed of operation of the vehicle systems may be denoted by V2.

By comparing a difference between an estimated real-time and an expected road gradient of a road segment during a low speed operation to a difference between an estimated real-time and an expected road gradient of a road segment during a high speed operation, it is possible to determine the size of a trailer's frontal area. Aerodynamic drag is proportional to the square of the vehicle speed and the size of the frontal area. The larger the frontal area of a trailer, the greater is the aerodynamic drag especially at high speeds. If the trailer attached to the vehicle has a small frontal area, the difference between real-time and expected road gradient may not change appreciably between low speed and high speed operation due to low aerodynamic drag. Also, for a trailer with a large frontal area, the difference between real-time and expected road gradient may significantly change between low speed and high speed operation due to high aerodynamic drag. Therefore by determining a difference between estimations of road gradient during low-speed and high-speed operations, it is possible to determine if the trailer attached to the vehicle has a small or a large frontal area. In this example, the difference between an expected road gradient (line 712) and a real-time road gradient (line 714) as estimated by a controller of the second vehicle system 704, during each of the low speed (V1) and high speed (V2) operations, is denoted by ΔS1 and ΔS2 respectively. Similarly, the difference between an expected road gradient (line 712) and a real-time road gradient (line 716) as estimated by a controller of the third vehicle system 706, during each of the low speed (V1) and high speed (V2) operations, is denoted by ΔL1 and ΔL2 respectively.

As seen from plot 708, the road elevation does not change appreciably throughout the road segment. Prior to time t1, the vehicle system(s) operate at a low speed, V1, which also does not change appreciably over time. As seen from the plots 712, 714, and 716, during operation at speed V1, the road gradient estimates by each of the vehicles with trailers having small and large frontal area is different from an expected road gradient estimate as obtained from an off-board or an on-board map. At time t1, there is a change in speed of the vehicle systems. Both the vehicle systems with trailers having small and large frontal areas accelerate within a short time to attain the higher vehicle speed, V2.

After time t2, the vehicle system(s) operate with a steady-state high speed V2. At speed V2, road gradient estimates by each of the vehicles with trailers having small and large frontal area is different from an expected road gradient estimate as obtained from an off-board or an on-board map. However, it is observed that the difference (ΔS1) between an expected road gradient (line 712) and a real-time road gradient (line 714) for the vehicle system 704 during low speed (V1) operations is not significantly different from the difference (ΔS2) between an expected road gradient (line 712) and a real-time road gradient (line 714) during high speed (V2) operation. Since difference between real-time and expected road gradient may not change appreciably between low speed and high speed operation due to low aerodynamic drag, it may be inferred that the trailer attached to the vehicle system 704 has a small frontal area. It is also observed that there is a significant difference between the difference between an expected road gradient (line 712) and a real-time road gradient (line 714) for the vehicle system 706 during low speed (V1) operations (ΔS1) and during high speed (V2) operations (ΔS2). Therefore, given the significant difference between real-time and expected road gradient during low speed and high speed operation due to high aerodynamic drag, it may be inferred that the trailer attached to the vehicle system 706 has a large frontal area.

In this way, during vehicle deceleration, a frontal area of the trailer may be determined based on a first change in the real-time road gradient relative to a second change in the expected road gradient, the frontal area increased as the first change exceeds the second change. Also, determination of the size of the frontal area may be carried out during deceleration events. During decelerations, as the speed of a vehicle system decreases, difference between the real-time and the expected road gradient may change due to change in aerodynamic drag. If the change is higher than a threshold change it may be inferred that the trailer has a large frontal area and of the change is lower than the threshold change, it may be inferred that the trailer has a small frontal area. By reliably determining specific trailer characteristics including the size of the frontal area of the trailer, engine performance may be optimized for the specific kind of trailer, thereby improving driving experience, drivetrain temperature management, fuel efficiency, and emissions quality.

One example method comprises, during vehicle driving over a road segment, inferring characteristics of a trailer attached to a vehicle based on a real-time road gradient relative to an expected road gradient for the road segment; and adjusting vehicle operations based on the inferred characteristics. In the preceding example, additionally or optionally, the real-time road gradient is estimated based on a vehicle speed profile during the travel over the road segment and further based on wheel contact forces of the vehicle as estimated by a powertrain controller. In any or all of the preceding examples, additionally or optionally, the expected road gradient is received from a navigation system located on-board the vehicle, the navigation system communicatively coupled to a control system of the vehicle. In any or all of the preceding examples, additionally or optionally, the navigation system is further communicatively coupled to an off-board server and wherein the expected road gradient is received at the vehicle from the off-board server via the navigation system. In any or all of the preceding examples, the inferred characteristics additionally or optionally include one or more of a weight, a size, and a size of frontal area of the trailer. In any or all of the preceding examples, additionally or optionally, the inferring includes inferring a size of the trailer based on a difference between the real-time road gradient and the expected road gradient during vehicle travel at a steady state speed over the road segment, the inferred size increased as the real-time road gradient exceeds the expected road gradient. In any or all of the preceding examples, additionally or optionally, the inferring includes inferring a weight of the trailer based on a difference between the real-time road gradient and the expected road gradient during vehicle acceleration over the road segment, the inferred weight increased as the real-time road gradient exceeds the expected road gradient. In any or all of the preceding examples, the inferring additionally or optionally includes inferring a frontal area of the trailer based on a first change in the real-time road gradient relative to a second change in the expected road gradient during vehicle deceleration over the road segment, the inferred frontal area increased as the first change exceeds the second change. In any or all of the preceding examples, additionally or optionally, the inferring includes inferring a frontal area of the trailer based on a first difference between the real-time road gradient and the expected road gradient during vehicle travel at a higher steady state speed relative to a second difference between the real-time road gradient and the expected road gradient during vehicle travel at a lower steady state speed, the frontal area increased as the first difference exceeds the second difference. Any or all of the preceding examples further comprising, additionally or optionally, estimating a first vehicle mass based on the real-time road gradient and a second vehicle mass based on the expected road gradient, wherein the inferring includes inferring the weight of the trailer based on the first mass relative to the second mass, the inferred weight increased as the first mass exceeds the second mass. Any or all of the preceding examples further comprising, additionally or optionally, uploading the real-time gradient to the off-board server, and updating the expected road gradient based on the real-time gradient. In any or all of the preceding examples, additionally or optionally, adjusting vehicle operations include adjusting one or more of a transmission gear shift schedule, engine fuel usage, and vehicle stability and sway control.

Another example method comprises generating an average road gradient estimate for a road segment on-board a vehicle based on wheel contact forces during vehicle travel, a confidence factor for the average road gradient estimate increased as a number of trips over the road segment increases; responsive to the confidence factor higher than a threshold, determining characteristics of a trailer attached to the vehicle based on the average road gradient estimate; and adjusting vehicle operation responsive to the trailer characteristics. In the preceding example, additionally or optionally, generating the average road gradient estimate includes determining a real-time road gradient estimate on each trip of the number of trips over the road segment, and calculating a statistical average of each real-time road gradient estimate. Any or all of the preceding examples further comprises, additionally or optionally, responsive to the confidence factor lower than a threshold, receiving an expected road gradient estimate from an off-board server, and on a given trip, determining the trailer characteristics based on the average road gradient estimate relative to the real-time road gradient estimate. In any or all of the preceding examples, additionally or optionally, the determining includes: during steady-state vehicle travel, determining a size of the trailer based on a difference between the real-time road gradient and the expected road gradient, the size increased as the real-time road gradient exceeds the expected road gradient; during vehicle acceleration, determining a weight of the trailer based on the difference between the real-time road gradient and the expected road gradient, the weight increased as the real-time road gradient exceeds the expected road gradient; and during vehicle deceleration, determining a frontal area of the trailer based on a first change in the real-time road gradient relative to a second change in the expected road gradient, the frontal area increased as the first change exceeds the second change. In any or all of the preceding examples, additionally or optionally, retarding a transmission gearshift when the trailer size is larger; retarding the transmission gearshift when the trailer weight is higher; and retarding the transmission gearshift when the frontal area of the trailer is larger.

In yet another example, a vehicle system comprises a vehicle with an engine; a transmission with a plurality of gearsets, the transmission coupling the engine to vehicle wheels; a trailer attached to the vehicle; a navigation system communicatively coupled to each of the vehicle and an off-board server; and a controller with computer readable instructions stored on non-transitory memory for: during vehicle travel over a road segment, estimating a real-time road gradient based on one or more of an engine torque, a powertrain torque, and a gear ratio; comparing the real-time road gradient with an expected road gradient retrieved via the navigation system; inferring one or more characteristics of the trailer based on the comparing; and adjusting a shift schedule of the transmission based on the inferred characteristics. In the preceding example, additionally or optionally, inferring includes estimating a first vehicle mass based on the real-time road gradient, estimating a second vehicle mass based on the expected road gradient, and inferring the one or more characteristics of the trailer based on the first vehicle mass relative to the second vehicle mass, the one or more characteristics including a trailer size, a trailer weight, and a trailer frontal area. In any or all of the preceding examples, additionally or optionally, the expected road gradient is a first off-board expected road gradient estimate, wherein the controller includes further instructions for: updating an on-board expected road gradient estimate based on the real-time road gradient; and updating a confidence factor of the on-board expected road gradient estimate based on a number of completed trips over the road segment.

In this way, by comparing a real-time road gradient (estimated on-board a vehicle) to an expected road gradient, it is possible to determine the presence of a trailer and further estimate trailer characteristics including its size, weight, and size of frontal area. Further, the classification of an attached trailer may be carried out automatically without the requirement of any input from a vehicle operator. By performing the comparison at different road grades and different vehicle speed conditions, it may be possible to determine specific trailer characteristics such as trailer weight and size of frontal area. By determining specific trailer characteristics (including details of size, weight, and size of the frontal area of the trailer) during vehicle travel, engine performance may be optimized based on the characteristics of the trailer, thereby improving driving experience, drivetrain temperature management, fuel efficiency, and emissions quality. The technical effect of creating and updating an on-board map with road gradient information is that even in the absence of an off-board map, such as due to lack of wireless connectivity and/or navigation data, the on-board map may be utilized in place of an off-board map. Once a confidence factor of the on-board map is high, trailer classification may be carried out based on the on-board map even in the absence of any off-board map.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
during vehicle driving, over a road segment, inferring characteristics of a trailer attached to a vehicle based on a real-time road gradient relative to an expected road gradient for the road segment; and
adjusting vehicle operations based on the inferred characteristics.

2. The method of claim 1, wherein the real-time road gradient is estimated based on a vehicle speed profile during travel over the road segment and further based on wheel contact forces of the vehicle as estimated by a powertrain controller, and wherein the inferred characteristics include a frontal area of the trailer.

3. The method of claim 2, wherein the inferred characteristics include one or more of a weight, a size, and a frontal area of the trailer.

4. The method of claim 2, wherein the inferring includes inferring a size of the trailer based on a difference between the real-time road gradient and the expected road gradient during vehicle travel at a steady state speed over the road segment, the inferred size increased as the real-time road gradient exceeds the expected road gradient.

5. The method of claim 2, wherein the inferring includes inferring a weight of the trailer based on a difference between the real-time road gradient and the expected road gradient during vehicle acceleration over the road segment, the inferred weight increased as the real-time road gradient exceeds the expected road gradient.

6. The method of claim 2, wherein the inferring includes inferring a frontal area of the trailer based on a first change in the real-time road gradient relative to a second change in the expected road gradient during vehicle deceleration over the road segment, the inferred frontal area increased as the first change exceeds the second change.

7. The method of claim 2, wherein the inferring includes inferring the frontal area of the trailer based on a first difference between the real-time road gradient and the expected road gradient during vehicle travel at a higher steady state speed relative to a second difference between the real-time road gradient and the expected road gradient during vehicle travel at a lower steady state speed, the frontal area increased as the first difference exceeds the second difference.

8. The method of claim 2, further comprising, estimating a first vehicle mass based on the real-time road gradient and a second vehicle mass based on the expected road gradient, wherein the inferring includes inferring a weight of the trailer based on the first mass relative to the second mass, the inferred weight increased as the first mass exceeds the second mass.

9. The method of claim 1, wherein the expected road gradient is received from a navigation system located on-board the vehicle, the navigation system communicatively coupled to a control system of the vehicle.

10. The method of claim 9, wherein the navigation system is further communicatively coupled to an off-board server and wherein the expected road gradient is received at the vehicle from the off-board server via the navigation system.

11. The method of claim 10, further comprising, uploading the real-time road gradient to the off-board server and updating the expected road gradient based on the real-time road gradient.

12. The method of claim 1, wherein adjusting vehicle operations includes adjusting one or more of a transmission gear shift schedule, engine fuel usage, and vehicle stability and sway control.

13. A method, comprising:
generating an average road gradient estimate for a road segment on-board a vehicle based on wheel contact forces during vehicle travel, a confidence factor for the average road gradient estimate increased as a number of trips over the road segment increases;
responsive to the confidence factor higher than a threshold, determining characteristics of a trailer attached to the vehicle based on the average road gradient estimate; and
adjusting vehicle operation responsive to the trailer characteristics.

14. The method of claim 13, wherein generating the average road gradient estimate includes determining a real-time road gradient estimate on each trip of the number of trips over the road segment, and calculating a statistical average of each real-time road gradient estimate.

15. The method of claim 14, further comprising, responsive to the confidence factor lower than the threshold, receiving an expected road gradient estimate from an off-board server, and on a given trip, determining the trailer characteristics based on the average road gradient estimate relative to the real-time road gradient estimate.

16. The method of claim 15, wherein determining the trailer characteristics includes:
during steady-state vehicle travel, determining a size of the trailer based on a difference between the real-time road gradient estimate and the expected road gradient estimate, the size increased as the real-time road gradient estimate exceeds the expected road gradient estimate;
during vehicle acceleration, determining a weight of the trailer based on the difference between the real-time road gradient estimate and the expected road gradient estimate, the weight increased as the real-time road gradient estimate exceeds the expected road gradient estimate; and
during vehicle deceleration, determining a frontal area of the trailer based on a first change in the real-time road gradient estimate relative to a second change in the expected road gradient estimate, the frontal area increased as the first change exceeds the second change.

17. The method of claim 16, wherein the adjusting includes:
retarding a transmission gearshift when the trailer size is large;
retarding the transmission gearshift when the trailer weight is higher than a threshold weight; and
retarding the transmission gearshift when the frontal area of the trailer is larger than a threshold size.

18. A vehicle system, comprising:
a vehicle with an engine;
a transmission with a plurality of gearsets, the transmission coupling the engine to vehicle wheels;
a trailer attached to the vehicle;
a navigation system communicatively coupled to each of the vehicle and an off-board server; and
a controller with computer readable instructions stored on non-transitory memory for:
during vehicle travel over a road segment, estimating a real-time road gradient based on one or more of an engine torque, a powertrain torque, and a gear ratio;

comparing the real-time road gradient with an expected road gradient retrieved via the navigation system;

inferring one or more characteristics of the trailer based on the comparing; and adjusting a shift schedule of the transmission based on the inferred characteristics.

19. The system of claim 18, wherein the inferring includes estimating a first vehicle mass based on the real-time road gradient, estimating a second vehicle mass based on the expected road gradient, and inferring the one or more characteristics of the trailer based on the first vehicle mass relative to the second vehicle mass, the one or more characteristics including a trailer size, a trailer weight, and a trailer frontal area.

20. The system of claim 18, wherein the expected road gradient is a first off-board expected road gradient estimate, wherein the controller includes further instructions for:

updating an on-board expected road gradient estimate based on the real-time road gradient; and updating a confidence factor of the on-board expected road gradient estimate based on a number of completed trips over the road segment.

\* \* \* \* \*